United States Patent
Vaiden

[15] 3,680,382
[45] Aug. 1, 1972

[54] THERMOCOUPLE PROTECTION TUBE FOR USE IN MOLTEN METAL

[72] Inventor: I. Clifford Vaiden, Loves Park, Ill.

[73] Assignee: Barber-Colman Company, Rockford, Ill.

[22] Filed: June 8, 1970

[21] Appl. No.: 44,290

[52] U.S. Cl. ............... 73/343 R, 73/359, 136/230, 136/232, 136/234
[51] Int. Cl. ............................................ G01k 1/14
[58] Field of Search ........ 73/359, 343; 136/234, 232, 136/230, 221

[56] References Cited

UNITED STATES PATENTS

| | | | |
|---|---|---|---|
| 2,218,779 | 10/1940 | Wendt | 73/343 |
| 3,309,237 | 3/1967 | Kelchner | 73/359 |
| 3,013,097 | 12/1961 | Fritts | 136/232 |

*Primary Examiner*—Louis R. Prince
*Assistant Examiner*—Denis E. Corr
*Attorney*—A. Richard Koch

[57] ABSTRACT

A shock spring provides flexibility between a Zircon protection tube for an immersion thermocouple and its mounting to reduce the possibility of breakage of the tube when it is struck by a ladle or other object.

8 Claims, 6 Drawing Figures

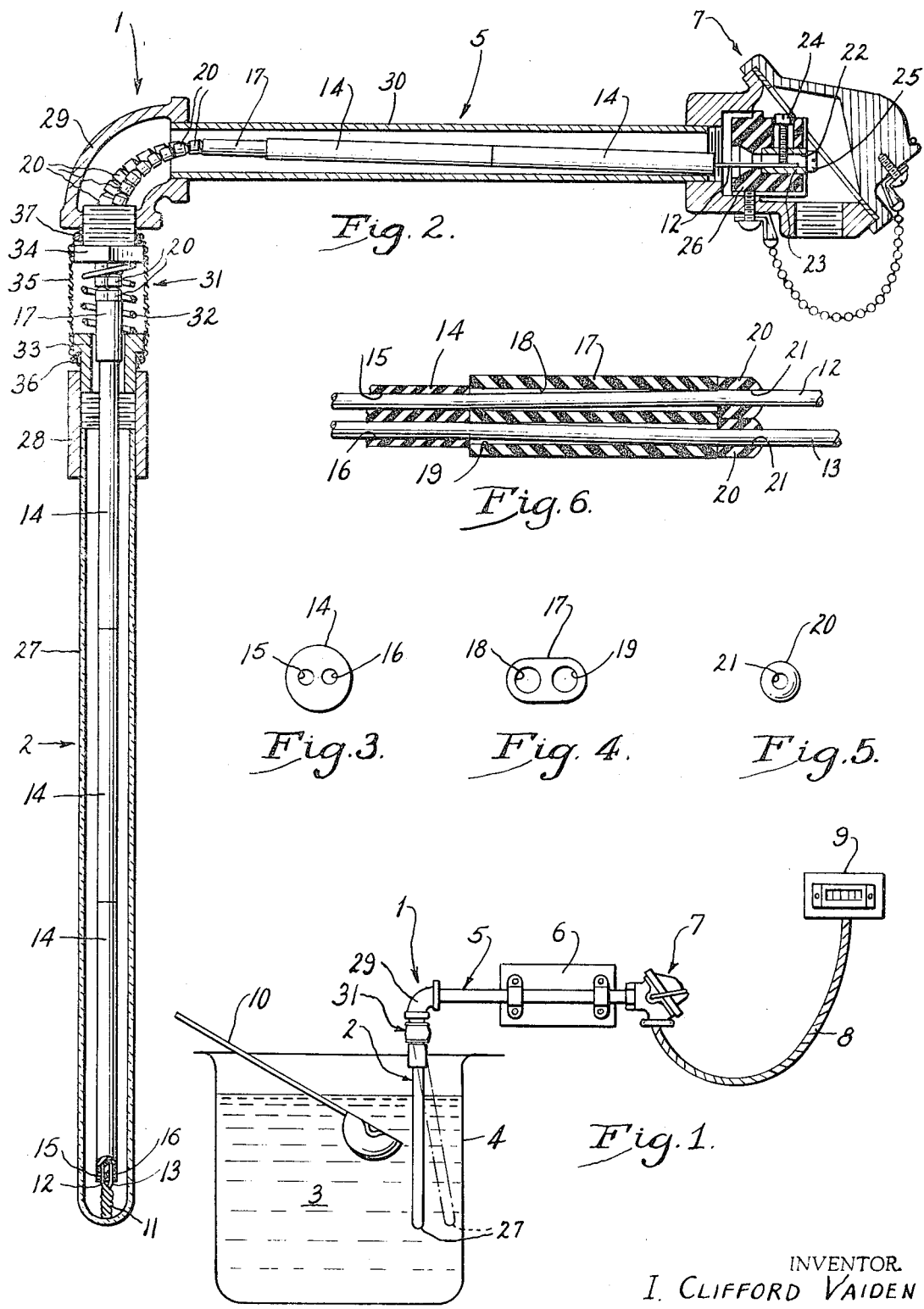

3,680,382

THERMOCOUPLE PROTECTION TUBE FOR USE IN MOLTEN METAL

BACKGROUND OF THE INVENTION

This invention is concerned with temperature measurement in molten metals and more particularly with means for reducing the possibility of breakage of fragile thermocouple protection tubes when they are subjected to forcible contact with another object.

In order to continuously measure the temperature of molten metals, a thermocouple or other temperature sensing device is immersed in the molten metal. Since molten metal is highly corrosive, it is necessary to protect the sensor by enclosing it in a corrosion resistant housing that will withstand the temperature encountered. Fused quartz and various refractory ceramic materials have been found acceptable for such housings, but they are fragile and therefore easily broken upon contact with another object. This invention is directed toward a solution of this problem.

In one application a thermocouple is enclosed in a refractory ceramic tube to protect it from the corrosive action of molten aluminum in a holding furnace. These furnaces are not very large so when an operator dips a ladle into the furnace to remove dross or some of the aluminum, he is very likely to hit the thermocouple housing. Since the ceramic tube is quite fragile, it is easily broken when mounted rigidly, as it was prior to my invention.

SUMMARY OF THE INVENTION

The present invention is based on the discovery that breakage of a fragile thermal sensor protective housing could be reduced by providing flexibility between the housing and its mounting to absorb the energy resulting from contact between the tube and other objects. The means for providing this flexibility are simple, inexpensive and easily installed.

BRIEF DESCRIPTION OF THE DRAWING

The drawing shows the preferred embodiment of this invention and its use.

FIG. 1 is a diagramatic representation of one use of this invention.

FIG. 2 is a sectional view through an immersion thermocouple employing this invention.

FIGS. 3, 4 and 5 are end views of insulators employed in FIG. 2.

FIG. 6 is a sectional view of the insulators of FIGS. 3, 4 and 5 with wires passing through them to show the transition from one to another.

DESCRIPTION OF THE PREFERRED EMBODIMENT

The preferred embodiment shown and described herein is primarily intended for use in measuring the temperature of molten aluminum in holding furnaces. It is to be understood that the invention is not limited to this preferred embodiment and that it is limited only by the scope of the claims.

The immersion thermal sensor 1 has a hot leg 2, part of which is immersed in the molten aluminum 3 confined in a holding furnace 4, and a cold leg 5, attached rigidly on a fixed mount 6 and having a head assembly 7 at its far end. A flexible armored cable 8 or other electrical conduit connects the head assembly 7 to a temperature indicator or controller 9. When some of molten aluminum 3 is dipped from the furnace 4 as by a ladle 10, a fixed hot leg 2 is easily broken if struck by the ladle, as may be readily seen in FIG. 1. When resilience is introduced into the mounting of the hot leg according to this invention, the hot leg may be deflected as shown in dotted lines and so reduce the possibility of breakage.

Details of the immersion thermal sensor 1 are shown in FIG. 2. The sensing element is a thermocouple junction 11 formed by twisting together and fusing first ends of two thermocouple wires 12 and 13, which may be iron and constantan respectively. The wires 12 and 13 apart from junction 11 are insulated from each other to prevent spurious measurements by lengths of elongated ceramic insulators 14 having two bores 15 and 16 lengthwise therethrough (as best seen in FIG. 3), ceramic transition insulators 17 having two bores 18 and 19 lengthwise therethrough (as seen in FIG. 4), and by ceramic fish spine beads 20, each having an axial hole 21 therethrough (as seen in FIG. 5). The elongated insulators 14 are used for long straight runs, and the beads 20 for bends. Each wire 12 and 13 has beads 20 strung on it where the wires must be flexed or bent so that there are always two beads side by side at such locations. When beads 20 are side by side, the holes 21 are spaced farther apart than the bores 15 and 16 in the elongated insulators 14, creating a misalignment between them. The transition insulators 17 have larger diameter bores 18 and 19 such that wires 12 and 13 may pass freely from bores 15 and 16 into bores 18 and 19 and from bores 18 and 19 into respective holes 21 when insulators 14 and 17 and the beads 20 are in abutting relationship, as shown in FIG. 6. The ends of wires 12 and 13 remote from junction 11 enter passageways 22 in respective terminals 23 (only one of which for wire 12 is shown), where they are held by set screws 24. A terminal screw 25 in each terminal 23 permits attachment of the sensor 1 to the external indicating or controlling device 9. The terminals 23 are retained in and insulated from each other by a terminal block 26.

A closed end tube 27 of refractory material substantially unaffected by the corrosive action of the molten metal 3 in furnace 4 protects the sensing element 11 from such corrosion and permits the element to be located at any desired depth in the molten metal. In this embodiment the tube is made of zircon, a refractory ceramic, substantially unaffected by, and not wetted by, molten aluminum. As is true of most ceramics, it is relatively fragile. The open end is cemented into one end of a pipe coupling 28. This combination forms the hot leg 2. The cold leg 5 comprises a pipe elbow 29, a pipe nipple 30 and the head assembly 7 enclosing the terminal block 26. In the prior art the hot leg 2 was rigidly connected to the cold leg 5 at elbow 29.

The heart of the present invention resides in a resilient adapter or connector 31 forming a connection between the hot and cold legs 2 and 5. In the present embodiment it comprises a helical spring 32 attached at each end as by brazing to threaded bushings or couplings 33 and 34 respectively, and a sleeve 35 of flexible material such as asbestos cloth surrounding the spring 32 and fastened to the bushings 33 and 34 as by wire clamps 36 and 37. Bushing 33 is threaded into pipe coupling 28 and bushing 34 is threaded into elbow 29 to complete the connection between the hot and cold legs 2 and 5. The spring 32 is stiff enough to hold the hot leg 2 in substantially fixed relation to cold leg 5 when no external force is applied, but is flexible enough to permit deflection of the hot leg from the fixed relationship when it is subjected to external force as by the ladle 10. The sleeve 35 prevents molten metal splashing onto and solidifying on the spring 32, thereby reducing its resilience. It further hinders molten metal from shorting the wires 12 and 13, where it would cause inaccurate readings. It also excludes molten metal from entering the top of tube 27.

In some embodiments it may be desirable to move the sensor as from one furnace to another. In that event the cold leg 5 would not be rigidly mounted, but could become a handle for supporting the hot leg 2 as it is being moved or while it is immersed in the molten metal. In either event it forms a support for the hot leg. The use of this invention is not confined to molten metals, but may encompass other fluids. When other metals or fluids are encountered it may be necessary or desirable to employ different materials in the tube 27 or other housing for the sensing element 11. Although a helical spring 32 has been employed in the preferred embodiment, any other resilient means (i.e., a bellows) could be substituted therefor.

I claim:

1. An immersion thermal sensor comprising a sensing element, a protective housing enclosing said sensing element, a support for said housing, said housing having one end adjacent the support and extending in one direction away from said support, and a resilient connection between said one end of the housing and an end of said support, said connection supporting said housing from said support and permitting deflection of the housing from its normal position.

2. A sensor according to claim 1 further comprising a coupling affixed to an end of said connection separably joining the connection to said housing.

3. A sensor according to claim 1 further comprising a coupling affixed to an end of said connection separably joining the connection to said support.

4. An immersion thermal sensor comprising a sensing element, a protective housing enclosing said sensing element, a support for said housing, and a resilient connection comprising a helical spring between an end of the support and an end of said housing, said spring permitting deflection of the housing from its normal position.

5. An immersion thermal sensor comprising a sensing element, a protective housing enclosing said sensing element, a support for said housing, a resilient connection between the support and said housing permitting deflection of the housing from normal position and a flexible sleeve surrounding said connection.

6. A sensor according to claim 5, said sleeve comprising asbestos cloth.

7. A sensor according to claim 5 further comprising first and second couplings affixed to respective opposed ends of said connection and separably joining the connection between said housing and said support, said couplings fastened to respective opposed ends of the sleeve.

8. A sensor according to claim 7, said connection comprising a helical spring.

* * * * *